(12) United States Patent
Olbert et al.

(10) Patent No.: US 8,409,539 B2
(45) Date of Patent: Apr. 2, 2013

(54) REACTOR AND METHOD FOR PRODUCING PHOSGENE

(75) Inventors: Gerhard Olbert, Dossenheim (DE); Torsten Mattke, Freinsheim (DE); Luc Vanderwaeren, Westerlo (BE); Filip Nevejans, St.Gillis-Waas (BE); Jan Hammenecker, Puurs (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 1472 days.

(21) Appl. No.: 10/504,848

(22) PCT Filed: Feb. 12, 2003

(86) PCT No.: PCT/EP03/01372
§ 371 (c)(1),
(2), (4) Date: Jan. 14, 2005

(87) PCT Pub. No.: WO03/072237
PCT Pub. Date: Sep. 4, 2003

(65) Prior Publication Data
US 2005/0118088 A1 Jun. 2, 2005

(30) Foreign Application Priority Data
Feb. 27, 2002 (DE) .................................. 102 08 398

(51) Int. Cl.
*C01G 1/04* (2006.01)
(52) U.S. Cl. .......................... 423/416; 585/922; 585/924
(58) Field of Classification Search .................. 423/416, 423/196, 201, 202; 422/196–205; 138/38; 165/181, 183; 585/900, 922, 924
See application file for complete search history.

(56) References Cited

U.S. PATENT DOCUMENTS 2,986,454 A 5/1961 Jewett
(Continued)

FOREIGN PATENT DOCUMENTS

EP 0 998 973 5/2000
EP 1 270 065 1/2003
(Continued)

OTHER PUBLICATIONS

Wolverine tube heat transfer data book. KJ Bell, AC Mueller—Wolverine Tube inc. pp. 31-38 (2001).*

(Continued)

*Primary Examiner* — Kaj K Olsen
*Assistant Examiner* — Jennifer Smith
(74) *Attorney, Agent, or Firm* — Oblon, Spivak, McClelland, Maier & Neustadt, L.L.P.

(57) ABSTRACT

A reactor (1) for preparing phosgene by gas-phase reaction of carbon monoxide and chlorine in the presence of a solid catalyst, which reactor has a bundle of parallel catalyst tubes (2) aligned in the longitudinal direction of the reactor whose ends are fixed in tube plates (3) and have a cap (4) at each end of the reactor (1), and has deflection plates (6) which are aligned perpendicular to the longitudinal direction of the reactor in the intermediate space (5) between the catalyst tubes (2) and leave free passages (7) located alternately opposite one another on the interior wall of the reactor, and in which the catalyst tubes (2) are charged with the solid catalyst, the gaseous reaction mixture is passed from one end of the reactor via one cap (4) through the catalyst tubes (2) and is taken off from the opposite end of the reactor (1) via the second cap (4) and a liquid heat transfer medium is passed through the intermediate space (5) around the catalyst tubes (2), where the reactor (1) has no tubes in the region of the passages (7), is proposed.

2 Claims, 11 Drawing Sheets

U.S. PATENT DOCUMENTS

| | | | |
|---|---|---|---|
| 3,518,284 A | | 6/1970 | Foster |
| 3,807,963 A | * | 4/1974 | Smith .......................... 422/197 |
| 3,876,693 A | | 4/1975 | Erpenbach et al. |
| 4,231,959 A | * | 11/1980 | Obrecht ........................ 562/847 |
| 6,084,125 A | * | 7/2000 | Kingsley et al. .............. 562/531 |
| 2005/0118088 A1 | * | 6/2005 | Olbert et al. .................. 423/416 |

FOREIGN PATENT DOCUMENTS

| | | |
|---|---|---|
| JP | 2003001094 A * | 1/2003 |
| WO | 02 02220 | 1/2002 |

OTHER PUBLICATIONS

Perrys chemical engineers handbook 6 ed. R Perry, D Green. New York: McGraw Hill. Section 11 (1984).*

U.S. Appl. No. 13/140,194, filed Jun. 16, 2011, Olbert, et al.

U.S. Appl. No. 13/140,227, filed Jul. 29, 2011, Olbert, et al.

U.S. Appl. No. 13/255,665, filed Sep. 9, 2011, Olbert, et al.

* cited by examiner

REACTOR AND METHOD FOR PRODUCING PHOSGENE

The invention relates to a reactor for preparing phosgene by gas-phase reaction of carbon monoxide and chlorine in the presence of a solid catalyst, to an apparatus and to a process for preparing phosgene using the reactor or the apparatus.

Phosgene is prepared industrially in a catalytic gas-phase reaction of carbon monoxide and chlorine in the presence of a solid catalyst, preferably activated carbon. The reaction is strongly exothermic: the enthalpy of formation is −107.6 kJ/mol. The reaction is generally carried out in a shell-and-tube reactor by the process described in Ullmanns Enzyklopädie der technischen Chemie, Vol. A 19, pages 413 to 414. In this process, the granular catalyst, which has a particle size in the range from 3 to 5 mm, is installed in tubes having an internal diameter of from 50 to 70 mm. The reaction commences at from 40 to 50° C., the temperature in the tubes rises to about 400° C. and then quickly drops. Carbon monoxide is used in a small excess to ensure that all the chlorine is reacted and chlorine-free phosgene is obtained. The reaction can be carried out at atmospheric pressure or under superatmospheric pressure, frequently at from 2 to 3 bar, so that the phosgene can be condensed by means of cooling water.

Phosgene is an important chemical in the preparation of intermediates and end products in virtually all branches of chemistry. The largest application in terms of quantity is the preparation of diisocyanates for polyurethane chemistry, in particular tolylene diisocyanate and diphenylmethane 4,4-diisocyanate.

To improve the removal of the heat of reaction by means of the heat transfer medium circulating between the catalyst tubes, deflection plates are installed between the catalyst tubes to generate transverse flow of the heat transfer medium over the catalyst tubes.

Known shell-and-tube reactors for the preparation of phosgene are completely filled with tubes to obtain maximum utilization of space in the interior of the reactor and have deflection plates between the catalyst tubes. These plates are kept relatively short, i.e. they are installed in a deflection region which does not extend as far as the interior wall of the reactor but instead they leave a proportion of from about 25 to 30% of the total reactor cross section free, in order to limit the pressure drop experienced by the heat transfer medium and thus the operating costs for the circulation pump for the heat transfer medium. In the deflection region, the flow profile of the heat transfer medium is altered around the catalyst tubes from transverse flow to longitudinal flow. The catalyst tubes are not cooled as well, so that corrosion problems occur on the catalyst tubes in the deflection region.

It is an object of the present invention to avoid corrosion problems on the catalyst tubes in the deflection region and to provide a reactor for preparing phosgene which makes possible an increased specific superficial velocity and thus has a higher capacity.

We have found that this object is achieved by a reactor for preparing phosgene by gas-phase reaction of carbon monoxide and chlorine in the presence of a solid catalyst, which reactor has a bundle of parallel catalyst tubes aligned in the longitudinal direction of the reactor whose ends are fixed in tube plates and have a cap at each end of the reactor, and has deflection plates which are aligned perpendicular to the longitudinal direction of the reactor in the intermediate space between the catalyst tubes and leave free passages located alternately opposite one another on the interior wall of the reactor, and in which the catalyst tubes are charged with the solid catalyst, the gaseous reaction mixture is passed from one end of the reactor via one cap through the catalyst tubes and is taken off from the opposite end of the reactor via the second cap and a liquid heat transfer medium is passed through the intermediate space around the catalyst tubes, the reactor of the present invention having no tubes in the region of the passages.

In the present context, the term passage refers to the region between the free end of a deflection plate and the interior wall of the reactor.

It was found that leaving the interior of the reactor free in the region of the passages as specified according to the present invention enables the capacity of a reactor for preparing phosgene to be increased by a factor of from 1.5 to 2.0 compared to a reactor completely filled with tubes at an unchanged interior volume and an increased amount of coolant, although a smaller total number of catalyst tubes is accommodated in the reactor.

In addition, it has been found that the reactor of the present invention for preparing phosgene by gas-phase reaction of carbon monoxide and chlorine in the presence of a solid catalyst can be constructed even without compensators for evening out thermal stresses in the reactor wall: it has been found that the temperature increase of the catalyst tube walls caused by the exothermic reaction occurs only in subregions of the tube walls, and can therefore be largely accommodated over the length of the catalyst tubes and only produces small stresses in the welded seams of the catalyst tube joins at the tube plates. This effect increases with increasing length of the catalyst tubes, especially when the length of the catalyst tubes is greater than 2.5 m. As a result of compensators on the reactor wall being omitted, the reactor becomes stiffer overall and the tube plates can therefore be made less thick. This advantageously leads to lighter apparatuses and, in addition, for an unchanged total length of the apparatus, the length of the catalyst tubes which can be utilized for accommodating the catalyst charge becomes greater, accompanied by a corresponding increase in the running time of the reactor. Thus, for example, it is possible to achieve a lengthening of the catalyst charge by about 40 cm, resulting in a running time increase for the reactor of the order of one year. In addition, the reactor without compensator is cheaper.

The geometry of the reactor of the present invention is in principle not subject to any restrictions. It preferably has a cylindrical shape, although other shapes having, for example, a square or rectangular cross section are also possible.

A bundle, i.e. a large number, of catalyst tubes are located in the reactor parallel to one another in the longitudinal direction of the reactor. The number of catalyst tubes is preferably in the range from 100 to 10000, in particular from 1000 to 3500.

The catalyst tubes are made of a corrosion-resistant material, for example stainless steel, preferably duplex steel 1.4462, stainless steel 1.4571 or stainless steel 1.4541. The entire reactor is preferably made of the materials mentioned above, especially of duplex or stainless steel.

Each catalyst tube preferably has a wall thickness in the range from 2.0 to 4.0 mm, in particular from 2.5 to 3.0 mm, and an internal tube diameter in the range from 20 to 90 mm, preferably in the range from 30 to 35 mm.

The catalyst tubes preferably have a length in the range from 1.5 to 6.0 m, in particular in the range from 2.0 to 3.5 m.

The catalyst tubes are preferably arranged in the interior of the reactor in such a way that the ratio of the spacing of the centers of directly adjacent catalyst tubes to the external diameter of the catalyst tubes is in the range from 1.15 to 1.4, preferably in the range from 1.2 to 1.3, and that the catalyst tubes are arranged in triangular pitch in the reactor.

At the two ends, the contact tubes are fixed in a liquid-tight manner, preferably welded, into tube plates. The tube plates likewise consist of a corrosion-resistant material, preferably stainless steel, in particular duplex steel, particularly preferably the same material as the catalyst tubes.

The internal diameter of the reactor is, if it is a cylindrical apparatus, from 0.5 to 6.0 m, preferably from 1.0 to 3.0 m.

Both ends of the reactor are closed off from the outside by caps. The reaction mixture is fed into the catalyst tubes through one cap, and the product stream is taken off through the cap at the other end of the reactor.

Gas distributors for uniformly distributing the gas stream, for example in the form of a plate, in particular a perforated plate, are preferably located in the caps.

In the intermediate space between the catalyst tubes, deflection plates are arranged perpendicular to the longitudinal direction of the reactor so as to leave free passages located alternately opposite one another on the interior wall of the reactor. The deflection plates deflect the heat transfer medium circulating in the interior of the reactor in the intermediate space between the catalyst tubes in such a way that the heat transfer medium flows transversely over the catalyst tubes, thus improving heat removal. To achieve this advantageous transverse flow over the catalyst tubes, the deflection plates have to leave passages free for the heat transfer medium alternately at the opposite sides of the interior wall of the reactor.

The number of deflection plates is preferably from about 6 to 21. They are preferably arranged at equal distances from one another, but the lowermost deflection plate and the uppermost deflection plate are each particularly preferably at a greater distance from the tube plate than the distance between two successive deflection plates, preferably by a factor of about 1.5.

The passages left free can in principle have any shape. In the case of a cylindrical reactor, they preferably have the shape of a segment of a circle.

It is preferred that all deflection plates leave equal-sized passages free.

The area of each passage is preferably from 5 to 20%, in particular from 8 to 14%, of the reactor cross section.

It is preferred that the deflection plates do not form a seal around the catalyst tubes and allow a leakage flow of up to 40% by volume of the total flow of the heat transfer medium. For this purpose, gaps having a width of from 0.1 to 0.6 mm, preferably from 0.2 to 0.3 mm, are provided between the catalyst tubes and the deflection plates.

It is advantageous for the deflection plates to form a liquid-tight seal against the interior wall of the reactor except in the regions of the passages, so that no additional leakage flow occurs at the interior wall of the reactor.

The deflection plates are made of a corrosion-resistant material, preferably stainless steel, in particular duplex steel, and preferably have a thickness of from 8 to 30 mm, preferably from 10 to 20 mm.

The catalyst tubes are charged with a solid catalyst, preferably activated carbon. The catalyst bed in the catalyst tubes preferably has a free volume of from 0.33 to 0.5, in particular from 0.33 to 0.40.

Both tube plates are preferably provided with vent and/or drainage holes, in particular at a plurality, preferably from 2 to 4, places distributed symmetrically over the reactor cross section, whose openings toward the outside preferably lead into half-shells welded onto the exterior wall of the reactor.

To balance thermal expansions, a compensator is advantageously provided in the outer wall of the reactor.

The introduction and discharge of the heat transfer medium into and from the intermediate space between the catalyst tubes preferably occurs via ports or part-ring channels on the outer wall of the reactor which have openings into the interior of the reactor and preferably have a circular or rectangular cross section and an opening ratio in the range from 5 to 50%, preferably from 15 to 30%.

The reactor is preferably symmetrical about a cross-sectional plane in the middle of the reactor. In this preferred embodiment, an upright reactor thus has upper and lower parts which are identical. For the purposes of the present invention, this means that all connections and the reactor brackets which serve to support the reactor are arranged symmetrically. The catalyst is consumed to a different extent in different regions as the reaction progresses as a result of the migration of the hot spot zone. Similarly, the catalyst tubes are subject to different stresses in different regions, with the greatest stress occurring in the region of the hot spot zone. In this hot spot zone, there is firstly corrosion of the interior wall of the catalyst tubes leading to the danger of the catalyst tubes leaking. In the case of leaking tubes, the entire reactor has to be emptied of catalyst charge and heat transfer medium and the catalyst charge which has been taken out has to be flushed with nitrogen for a number of days. The leaking tube or tubes have to be replaced and refilled with catalyst. This danger can be alleviated by means of the above-described symmetrical configuration which makes it possible to turn the reactor in good time before a certain critical degree of corrosion is reached, so that the hot spot region moves to a part of the catalyst tubes which has previously been subject to less stress. This enables the operating time of the reactor to be increased considerably, frequently doubled.

In an advantageous embodiment, the reactor of the present invention has a plurality of zones, in particular two or three zones, with different cooling being applied in the zones. Particular preference is given to a two-zone reactor. This embodiment can be used particularly advantageously when chlorine which has largely been freed of bromine is used as starting material for the reaction to form phosgene. It has in this case been observed that the reaction to form phosgene proceeds more slowly than when bromine-contaminated chlorine is used. The reason for this could be free-radical formation of bromine with activated carbon, which accelerates the reaction with chlorine. If the phosgene formation reaction proceeds more slowly, for example because of the use of chlorine which has largely been freed of bromine, it would in principle be possible to increase the total conversion to phosgene by increasing the inlet temperature of the heat transfer medium. However, this is possible only to a limited extent, since the liquid heat transfer medium can boil at the outer wall of the catalyst tubes and consistent heat transfer and consistent reaction conditions are therefore no longer ensured.

For this reason, an advantageous embodiment as two-zone reactor with different cooling of the two zones, namely with stronger cooling in the first zone in the flow direction of the reaction mixture, i.e. the main reaction region, and with weaker cooling in the second zone, i.e. in the after-reaction region or in the region in which residual conversion occurs, is provided. Cooling in the first zone is preferably carried out using a colder heat transfer medium than in the second zone.

The two zones are separated from one another in a liquid-tight manner by means of a dividing plate in the intermediate space between the catalyst tubes so that the heat transfer medium cannot flow from one zone into the other within the reactor. The catalyst tubes are rolled into the separating plates or hydraulically widened so as to form a seal. The dividing plate advantageously has a thickness in the range from 15 to 60 mm, preferably from 30 to 50 mm.

In the case of three-zone or multizone reactors, two or more dividing plates are correspondingly provided to separate the individual zones from one another.

To even out thermal stresses, a compensator is advantageously provided on the reactor wall in each reaction zone.

In the case of a two-zone reactor, the length ratio of zone 1 to zone 2 can be in the range from 1:1 to 3:1, advantageously 2:1.

The total length of the catalyst tubes of a two-zone reactor is frequently in the range from 2.5 to 6.0 m, preferably in the range from 3.0 to 4.0 m.

The progress of the reaction can be monitored by means of the exit temperature of the heat transfer medium from the second zone. If the temperature there increases appreciably, it indicates that the reaction front is migrating into the lower region of the reactor.

A smaller volume flow of heat transfer medium is required in the second zone compared to the first zone. The heat transfer medium stream leaving the second zone can be combined with the heat transfer medium stream entering the first zone, so that a greater total volume of heat transfer medium flows through the first zone.

The deflection plates for the heat transfer medium preferably have no tubes in all zones of the two-zone, three-zone or multizone reactor.

A sheath for accommodating a multithermocouple with two or more temperature measuring points, whose open end is below the reactor, is preferably provided in at least one of the catalyst tubes. The sheath is inserted via a port through the lower cap of the reactor. Positioning it in the lower catalyst tube region is advantageous because of the lower reaction temperature in this region. In general, the temperature in the upper catalyst tube region of a phosgene reactor is higher, with a correspondingly greater stress on the materials as a result of the aggressive reaction mixture comprising phosgene and chlorine. If, on the other hand, the sheath is located in the lower catalyst tube region as proposed, the stress on the material of the sheath is lower because of the lower temperatures prevailing there. The multithermocouple is preferably hard-wired and has two or more, preferably up to 10, preferably regularly spaced temperature measuring points. The temperature measurement allows the progress of the reaction to be monitored and measurements which allow conclusions to be drawn as to the catalyst activity and the appropriate time of replacement of the catalyst can be obtained.

The invention also provides an apparatus for preparing phosgene by gas-phase reaction of carbon monoxide and chlorine in the presence of a solid catalyst, which comprises two or more reactors of the above-described type which are connected in series, wherein a concentration measuring point for the residual chlorine content and/or a temperature measuring point is/are preferably provided in the connecting piece between the lower cap of the upper reactor and the upper cap of the lower reactor.

Preference is given to two reactors being connected in series and the second reactor having catalyst tubes having a larger internal tube diameter than in the first reactor, in particular an internal tube diameter in the range from 20 to 110 mm, preferably in the range from 60 to 90 mm.

In a further embodiment, it is possible to connect two or more reactors directly in series without caps located in between. Preference is given to connecting two reactors directly in series. The adjacent tube plates, i.e. the lower tube plate of the first reactor and the upper tube plate of the second reactor, are advantageously joined to one another by means of spacers which keep them some distance apart so as to allow transverse mixing of the reaction mixture leaving the catalyst tubes of the first reactor before it enters the second reactor.

A reactor as described above or an apparatus can advantageously be enclosed by a safety chamber. In this case, the second and/or further reactors preferably have a smaller external dimension than the upstream reactor, so that these can be replaced more easily.

The invention also provides a process for preparing phosgene by gas-phase reaction of carbon monoxide and chlorine in the presence of a solid catalyst in a reactor as described above.

The liquid heat transfer medium used in the process of the present invention is preferably water, aqueous sodium hydroxide solution or one or more, preferably chlorinated hydrocarbons, in particular monochlorobenzene.

The process of the present invention is not restricted in respect of the flow directions of gaseous reaction mixture and heat transfer medium; it is equally possible to pass the gaseous reaction mixture and the liquid heat transfer medium through the reactor in cross-countercurrent or in cross-cocurrent. The gaseous reaction mixture can equally well be passed via the caps through the catalyst tubes of the reactor from the top or from the bottom.

The catalyst installed in the catalyst tubes is preferably activated carbon, in particular in the form of spheres, cones, cylinders, extrudates, rings or pellets. The region of the catalyst tubes nearest the end at which the gaseous reaction mixture is fed in is particularly preferably filled with an inert material to a length of from 5 to 20%, preferably a length of from 5 to 10%, of the total tube length of the catalyst tubes.

An at least partially open-pored carbon foam can advantageously be installed as catalyst in the catalyst tubes. Such catalysts are particularly advantageous because of the very high internal surface area.

The catalyst tubes are preferably configured, in particular by means of the arrangement in the interior of the reactor, in such a way that their heat transfer coefficient to the heat transfer medium is in the range from 500 to 2000 $W/m^2/K$, in particular in the range from 1000 to 1500 $W/m^2/K$.

The process of the present invention is preferably carried out by passing carbon monoxide and chlorine in a molar ratio in the range from 1.01 to 1.10, in particular in the range from 1.03 to 1.06, through the catalyst tubes from the top or from the bottom, with the longitudinal axis of the reactor being aligned vertically.

In the process of the present invention, the pressure in the reactor is preferably from 2 to 10 bar absolute, in particular from 3 to 5 bar absolute.

The superficial velocity through the reactor is preferably from 0.5 to 4 kg of phosgene per second per $m^2$ of reaction tube cross-sectional area through which flow occurs, in particular from 1.5 to 3 kg of phosgene per second per $m^2$ of reaction tube cross-sectional area through which flow occurs. The per superficial velocity is thus increased compared to conventional phosgene reactors.

The invention is illustrated below with the aid of a drawing and examples.

In the drawing.

In the figures, identical reference numerals denote identical or analogous features.

Figure 1:
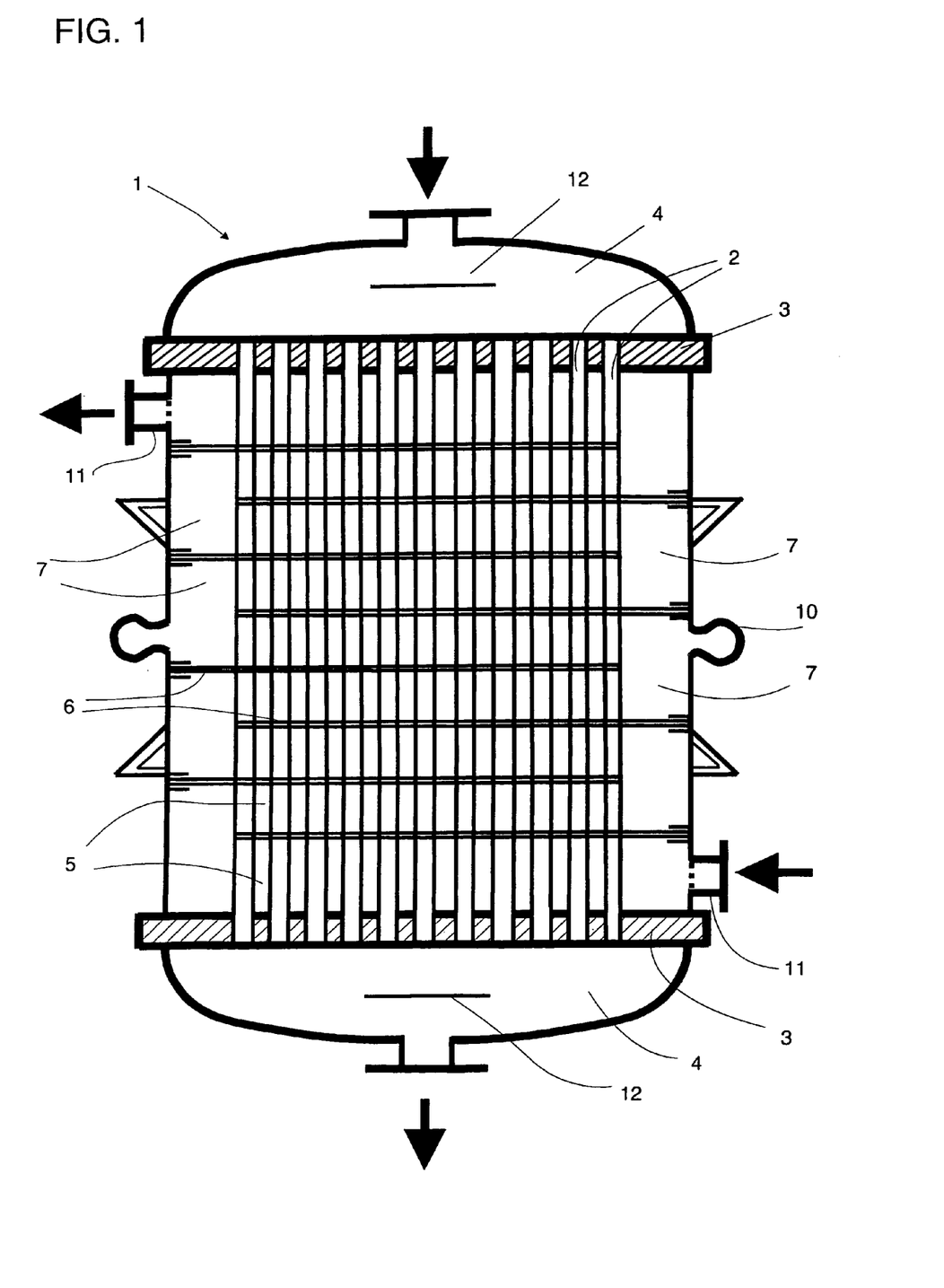
FIG. 1 shows a longitudinal section of a first preferred embodiment of a reactor according to the present invention with cross-countercurrent flow of reaction mixture and heat transfer medium.

FIG. 1 shows a longitudinal section of a preferred embodiment of a reactor 1 according to the present invention having a bundle of catalyst tubes 2 which are fixed parallel to one another in the longitudinal direction of the reactor 1 and are sealed into tube plates 3, with caps 4 at both ends of the reactor 1 and gas distributors 12 preferably located therein. In the intermediate space 5 between the catalyst tubes 2, through which the liquid heat transfer medium flows, deflection plates 6 are arranged perpendicular to the longitudinal direction of the reactor so as to leave free passages 7 located alternately opposite one another on the interior wall of the reactor.

Ports or segments of circular channels 11 are provided for introduction and discharge of the heat transfer medium. To even-out thermal stresses, a compensator 10 is provided on the reactor wall.

Figure 2:
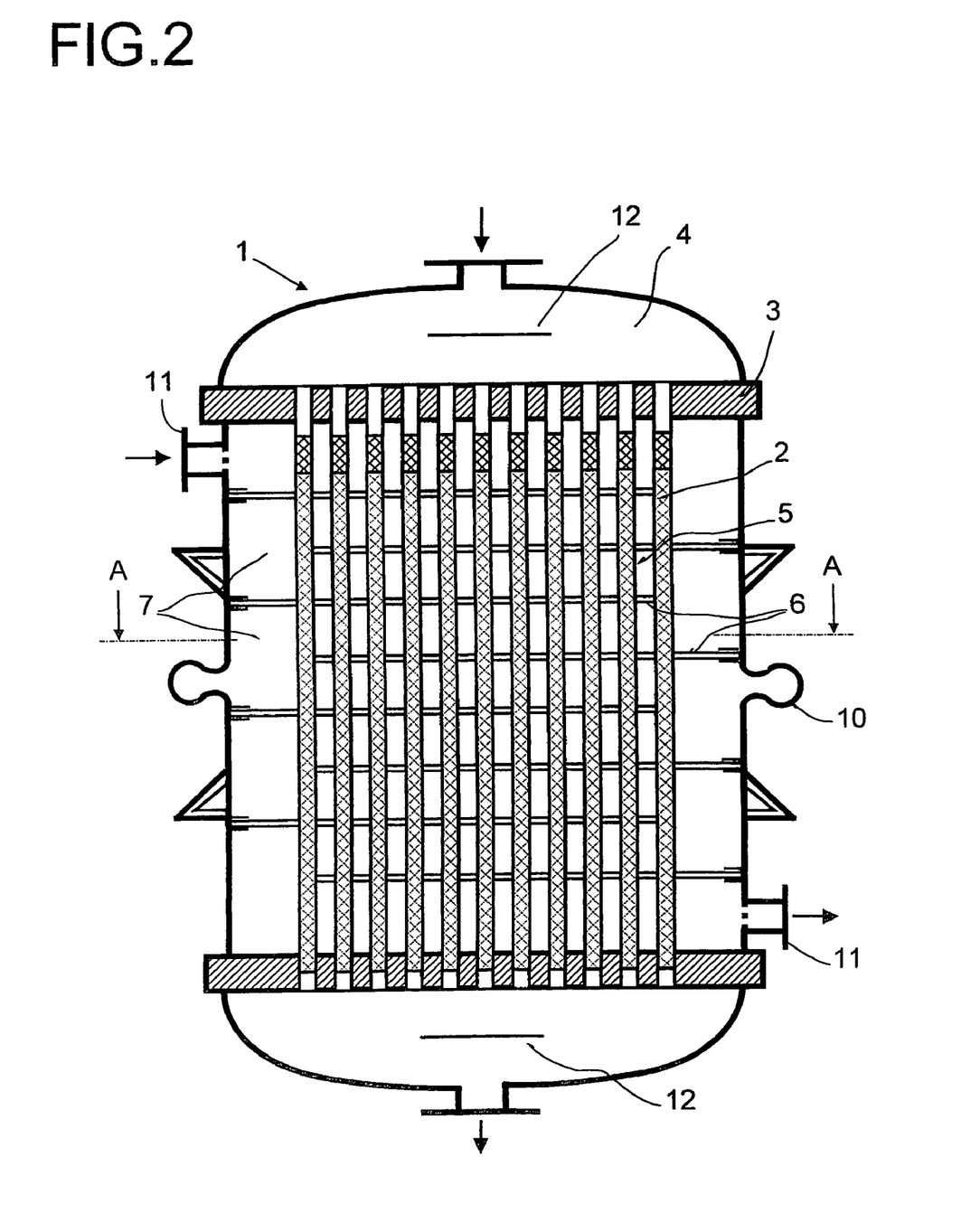
FIG. 2 shows a longitudinal section of a further preferred embodiment of a reactor according to the present invention in which reaction mixture and heat transfer medium are conveyed in cross-cocurrent and the catalyst tubes are filled with an inert material in the region where the reaction mixture enters.

The further preferred embodiment shown in FIG. 2 differs from the embodiment shown in FIG. 1 in the flow of reaction mixture and heat transfer medium (cross-cocurrent).

The catalyst tubes 2 are preferably, as shown in FIG. 2, filled with an inert material in the region where the gaseous reaction mixture enters.

Figure 3:
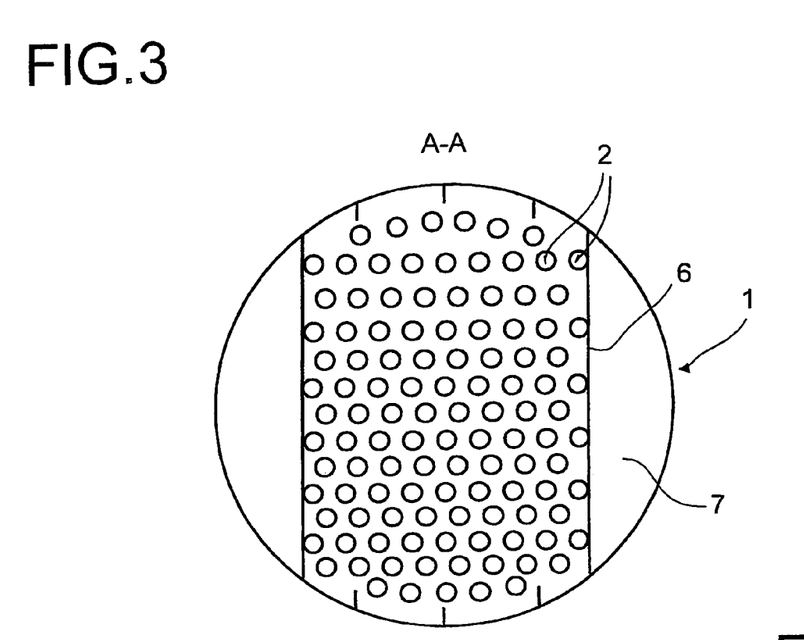
FIG. 3 shows a cross section in the plane A-A through a reactor according to the present invention shown in FIG. 1 or FIG. 2.

The cross-sectional view in FIG. 3 shows the preferred shape, namely that of a segment of a circle, of the passages 7 left free by the deflection plates 6 in the region of the interior wall of the reactor.

Figure 4:
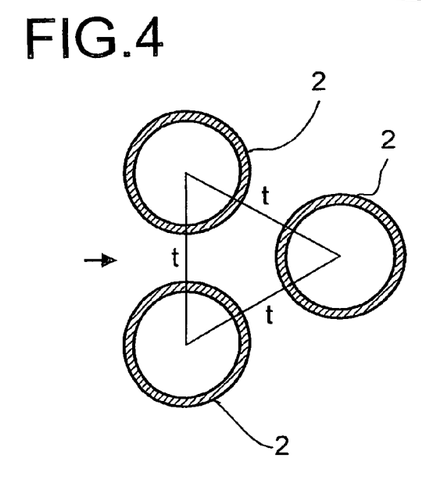
FIG. 4 shows part of the cross section of FIG. 3, FIGS. 5 to 7 each show parts of the longitudinal sections in FIG. 1 or FIG. 2.

FIG. 4 shows the preferred arrangement of the catalyst tubes 2 in triangular pitch, i.e. with the same distance t between the centers of directly adjacent catalyst tubes.

Figure 5:
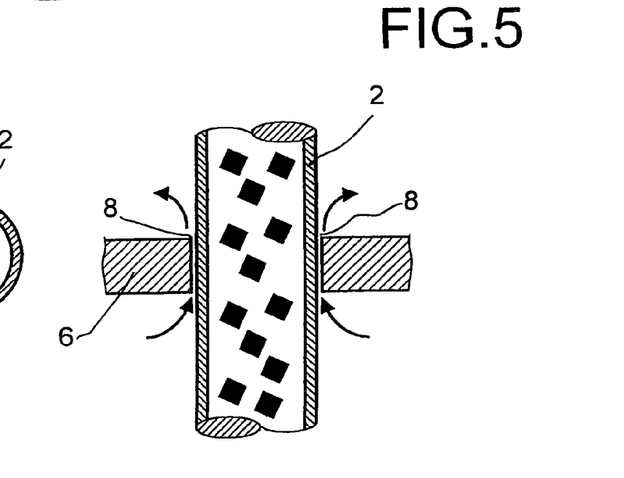

The enlarged view in FIG. 5 shows the preferred provision of gaps 8 between catalyst tubes 2 and deflection plates 6.

Figure 6:
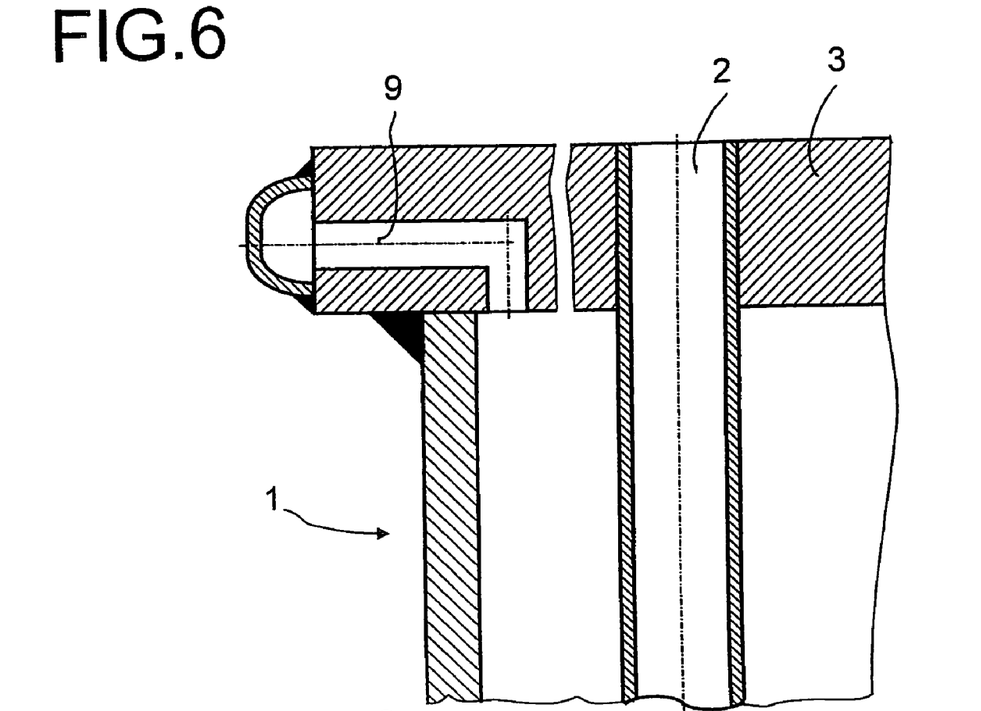

FIG. 6 shows the preferred arrangement of vent and/or drainage holes 9 to the outside in the tube plates 3. The opening of the vent and/or drainage holes to the outside is preferably, as shown in FIG. 6, covered by a welded-on half shell as collector.

Figure 7:
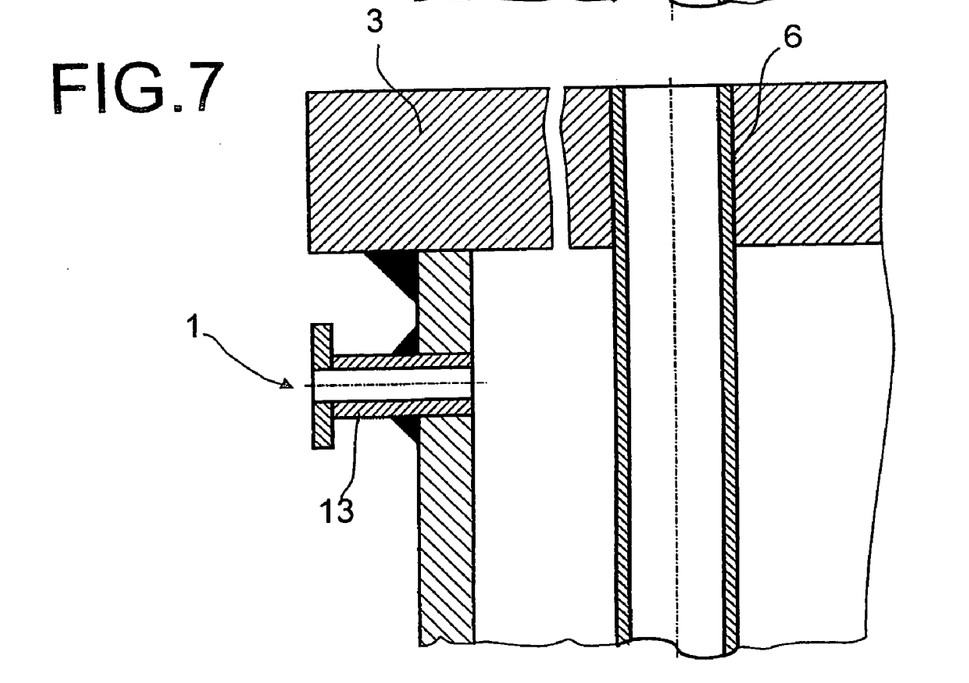

FIG. 7 shows another type of venting, by means of venting ports 13. For this purpose, a hole is drilled into the reactor wall and a port is welded on, preferably about 20 mm below the tube plate.

Figure 8:
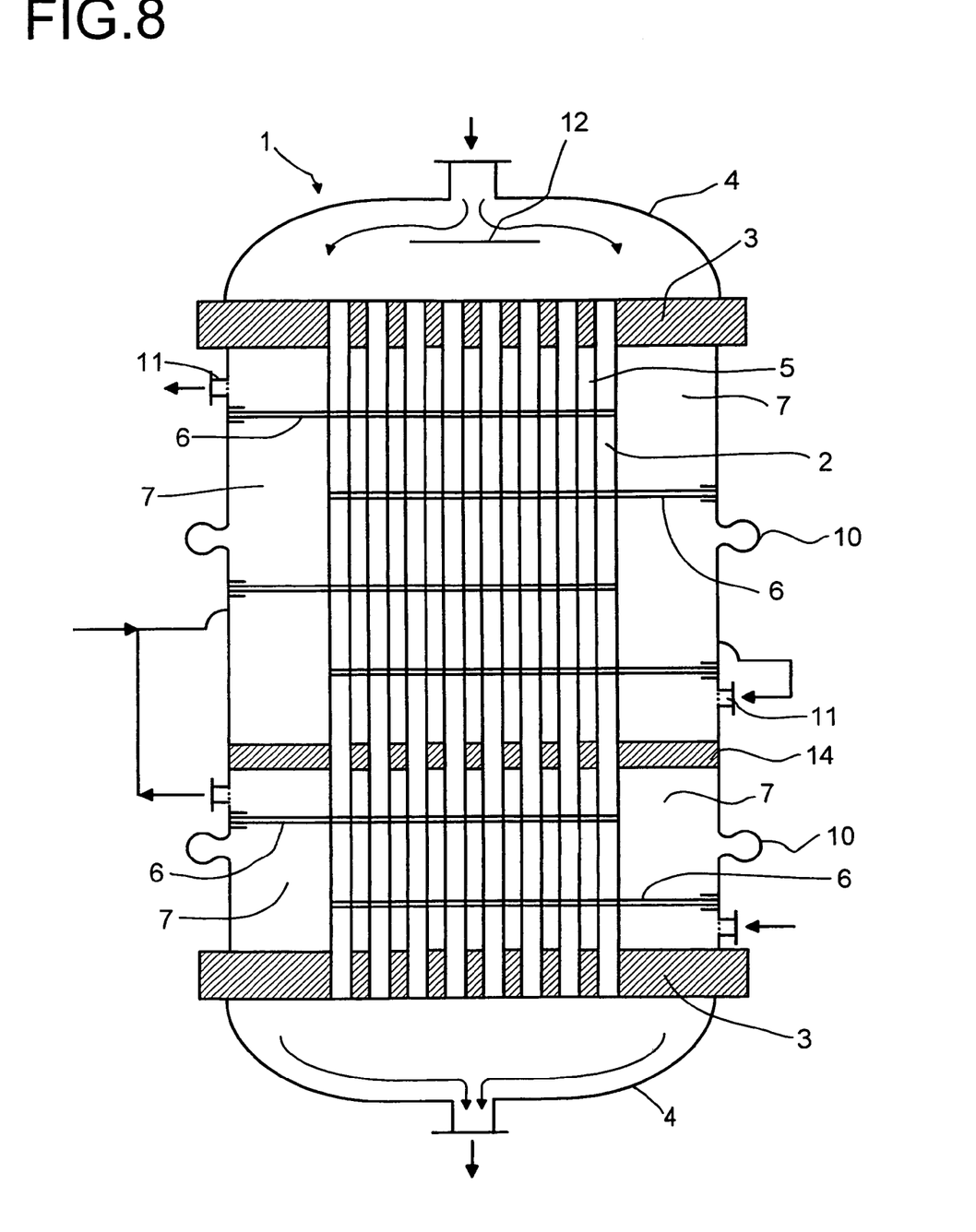
FIG. 8 shows a preferred embodiment of a two-zone reactor.

The reactor shown in longitudinal section in FIG. 8 has a dividing plate 14 which divides the intermediate space 5 between the catalyst tubes 2 into a first, upper zone and a second, lower zone in a liquid-tight manner. It can be seen from the figure that, in a preferred way of carrying out the process, a substream of the heat transfer medium leaving the second zone can be mixed into the stream of heat transfer medium fed into the first zone.

Figure 9:
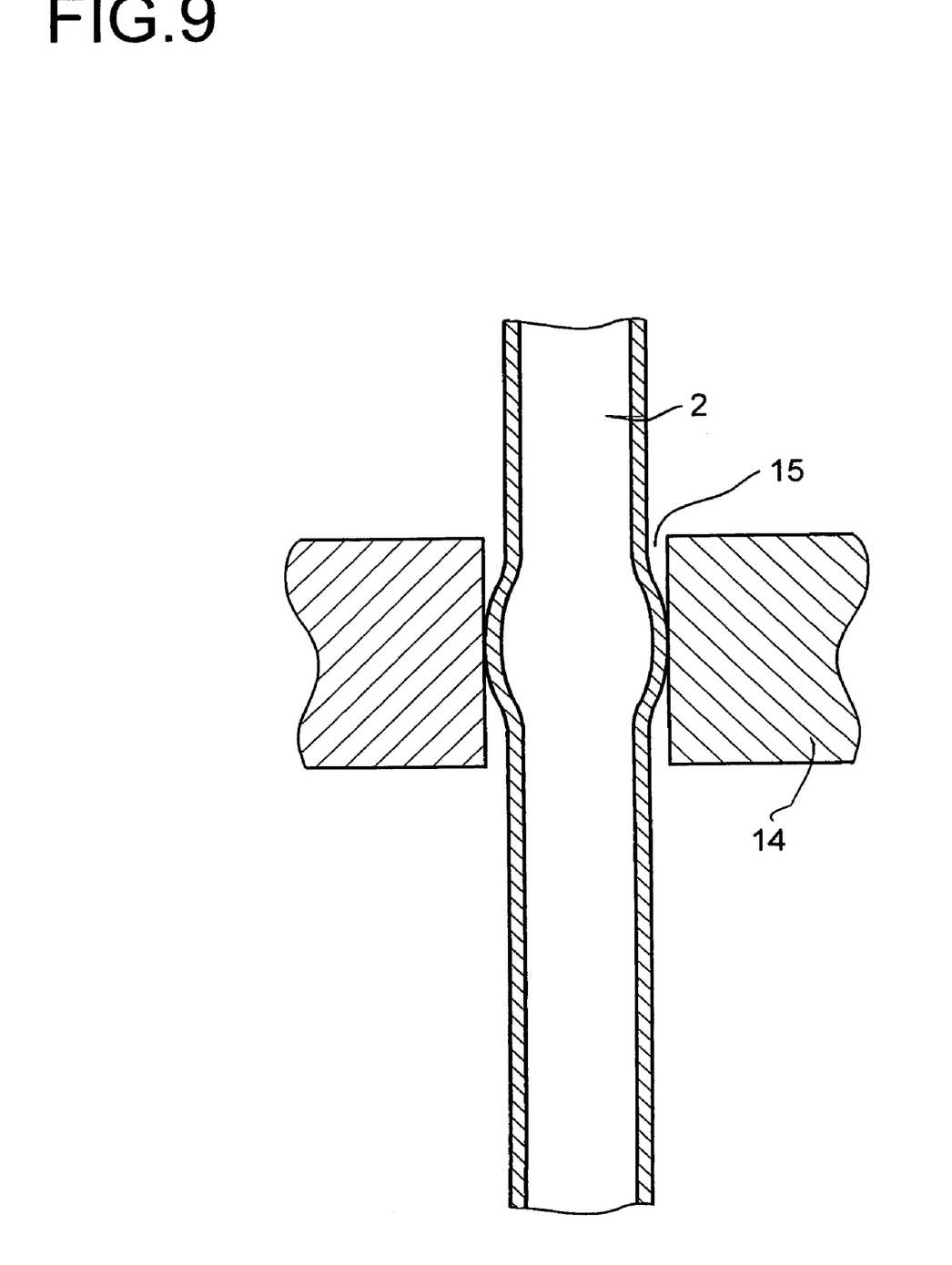
FIG. 9 shows a detail of the reactor of FIG. 8.

FIG. 9 shows a detail of the reactor shown in FIG. 8, namely the liquid-tight rolling-in or hydraulic tube widening of the catalyst tube 2 into the dividing plate 14, thus closing the gap 15 between catalyst tube 2 and dividing plate 14.

Figure 10:
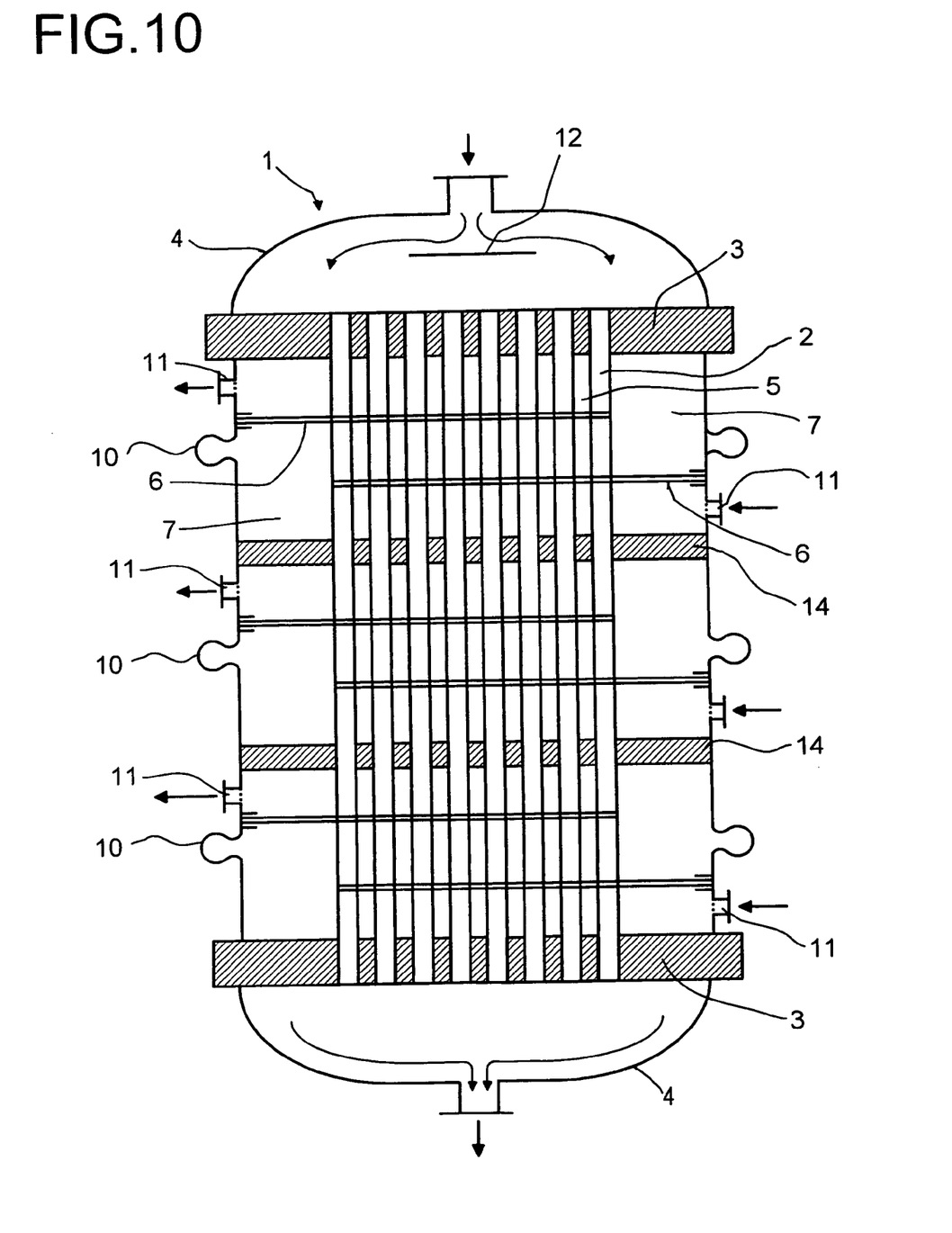
FIG. 10 shows a preferred embodiment of a three-zone reactor.

FIG. 10 shows a further preferred embodiment of a reactor 1 having three zones separated from one another in a liquid-tight manner by dividing plates 14.

Figure 11:
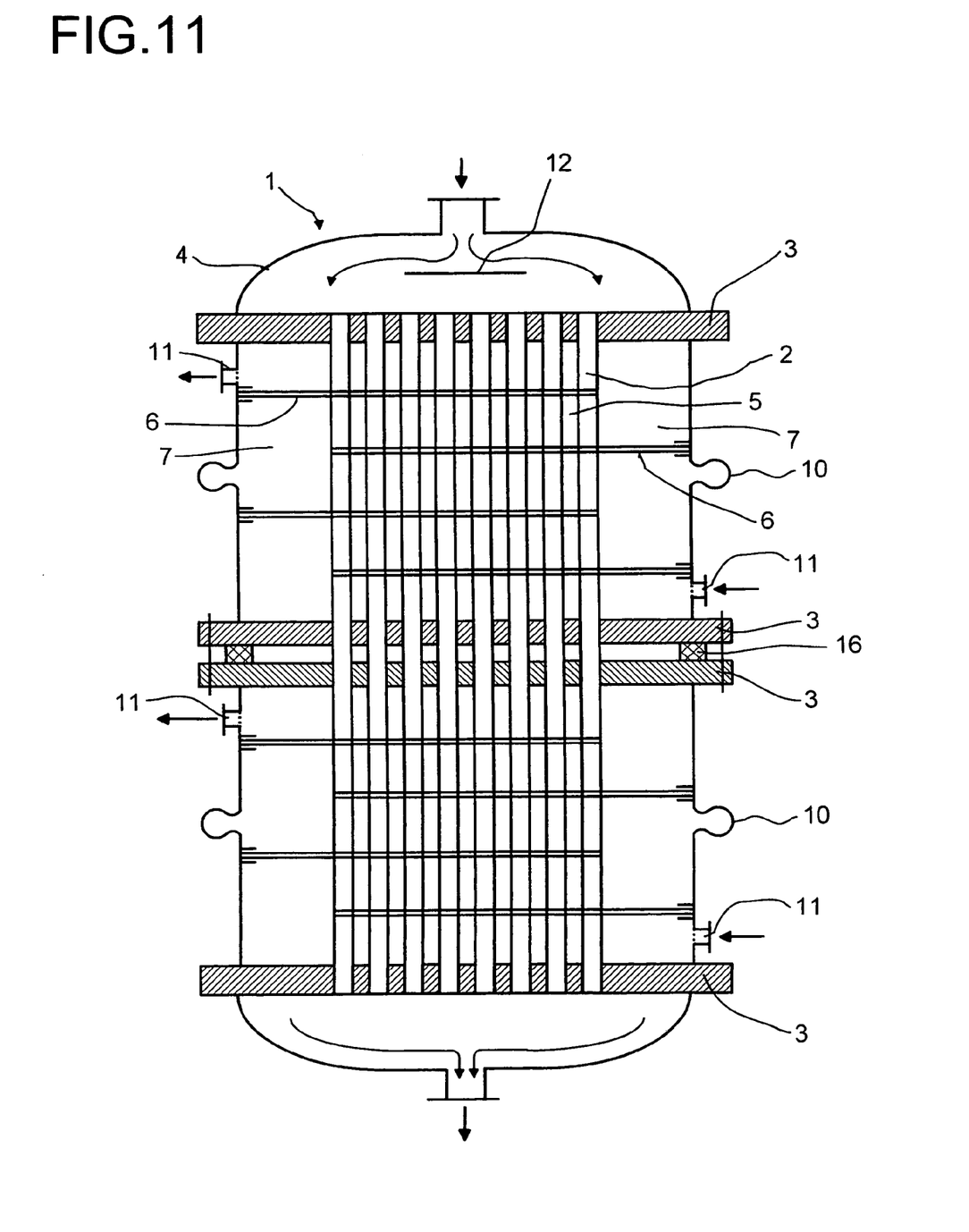
FIG. 11 shows a preferred embodiment of two reactors located directly above one another, with both reactors having no tubes in the deflection region of the heat transfer medium.

FIG. 11 shows an arrangement of two reactors connected directly in series, with the lower cap of the upper reactor and the upper cap of the lower reactor being omitted. A spacer 16 is provided between the lower tube plate of the upper reactor and the upper tube plate of the lower reactor. Both reactors have no tubes in the deflection region for the heat transfer medium.

Figure 12:
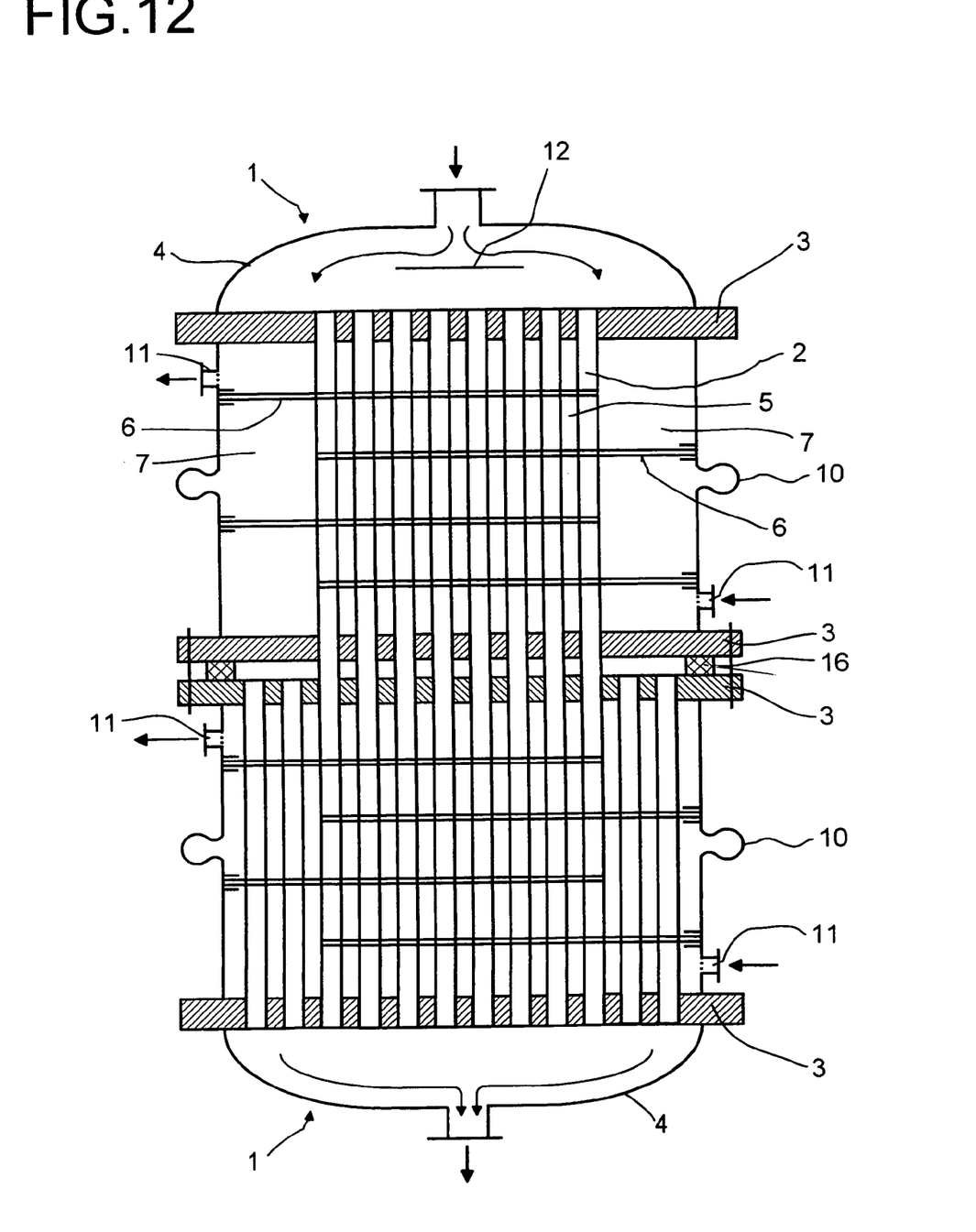
FIG. 12 shows a further preferred embodiment of two reactors arranged directly above one another, with the second reactor having tubes in all places.

The embodiment shown in FIG. 12 differs from the previous embodiment in that the second reactor has tubes in all places, i.e. it is provided with catalyst tubes even in the deflection region for the heat transfer medium.

Figure 13:
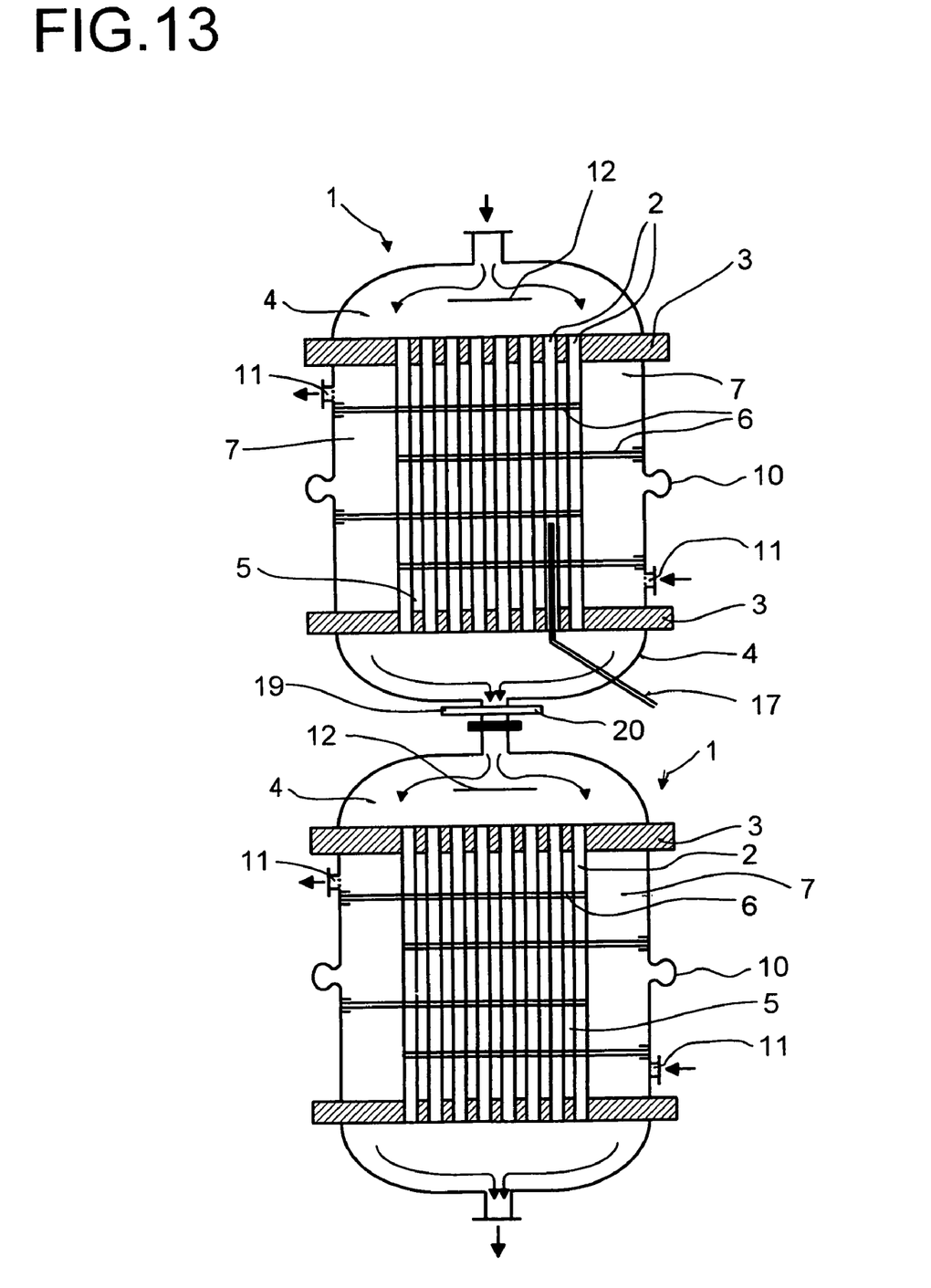
FIG. 13 shows an apparatus having two reactors connected in series and FIG. 14 shows a section from FIG. 13 with a sheath for accommodating a thermocouple.

FIG. 13 shows an apparatus comprising two reactors 1 connected in series and having a sheath 17 which opens to the outside via the lower cap 4 of the first reactor 1 and serves to accommodate a multithermocouple 18. In the connecting piece between the two reactors 1, a concentration measuring cell 19 for the residual chlorine content and a temperature measuring point 20 are provided.

Figure 14:
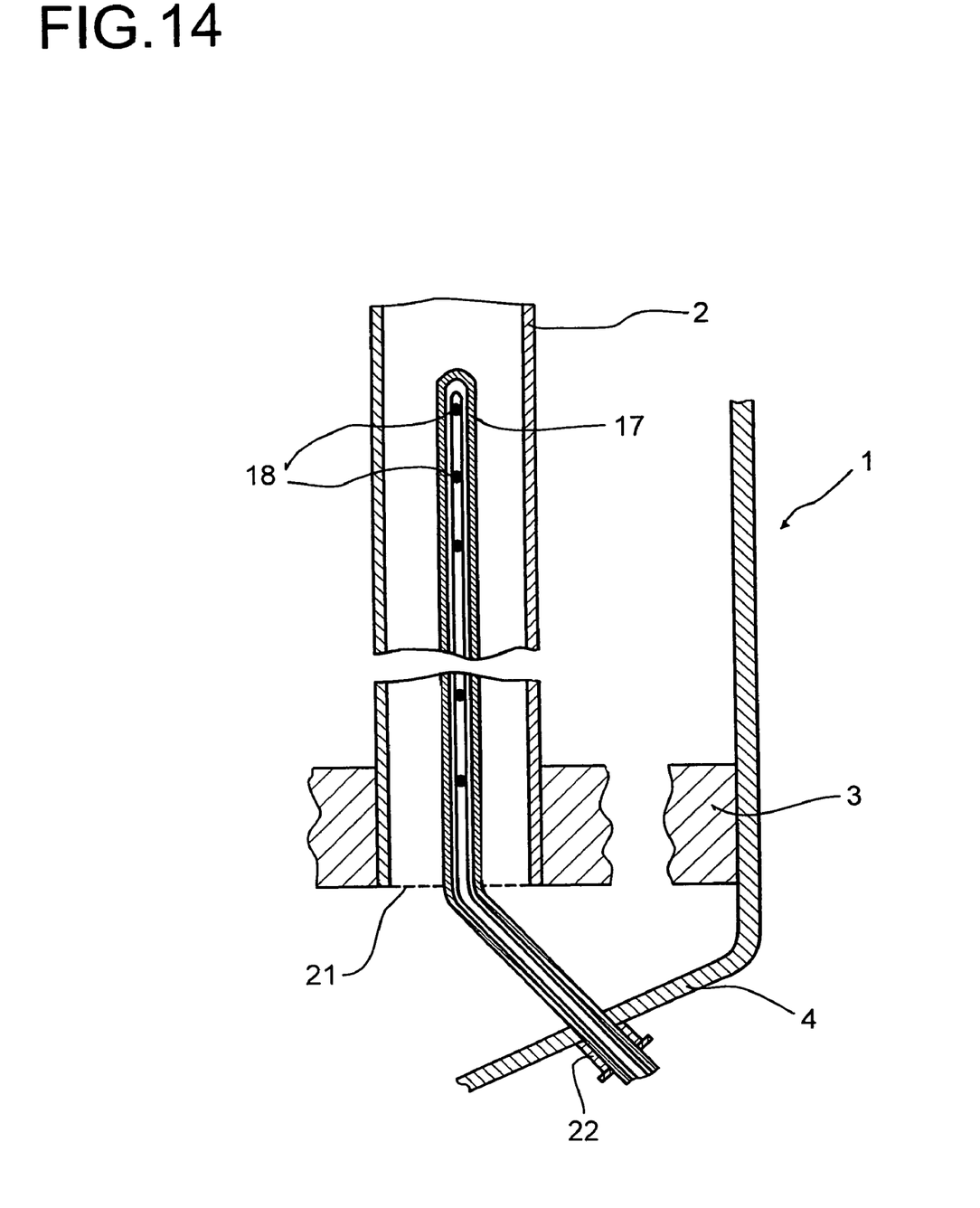

The section in FIG. 14 shows the arrangement of the multithermocouple 18 with a plurality of temperature measuring points in the sheath 17 which opens to the outside via the port 22 in the lower cap 4 of the reactor 1. The detail depicted in FIG. 14 also shows the support 21 for the catalyst in the catalyst tube 2.

The invention is illustrated below with the aid of an example:

7087 kg/h of chlorine and 2913 kg/h of carbon monoxide were passed through the catalyst tubes of a cylindrical shell-and-tube reactor having 1256 catalyst tubes which each had a tube length of 3000 mm, an internal tube diameter of 39.3 mm and a wall thickness of 2.6 mm and were filled to a length of 200 mm with an inert ceramic material in the region where the reaction mixture was fed in and subsequently filled to a length of 2700 mm with a bed of a cylindrical catalyst comprising activated carbon and having a diameter of the cylindrical catalyst particles of 4 mm and a length of 5 mm and a porosity of 0.404 at an admission pressure of the reaction gas, i.e. a pressure of the reaction gas upstream of the reactor, of 4 bar absolute to give a product stream of about 10000 kg/h of phosgene.

The reactor was provided with ten deflection plates which left free passages having the shape of a segment of a circle and each corresponding to about 15% of the total reactor cross section which were located alternately in the region between the free end of each deflection plate and the interior wall of the reactor.

The catalyst tubes were made of duplex steel 1.4462.

A reaction mixture of carbon monoxide and chlorine in a molar ratio of 1.04226 was passed from the top downward through the catalyst tubes. The liquid cooling medium, viz. monochlorobenzene, was passed through the reactor from the bottom upward in the region between the catalyst tubes.

The inlet temperature of the reaction mixture was 50° C. The inlet temperature of the liquid cooling medium, viz. monochlorobenzene, was 60° C.

The abovementioned apparatus and process conditions were left unaltered for a comparative experiment according to the prior art and for an experiment according to the process of the invention. The only difference was that the reactor according to the prior art had a full complement of tubes in the region of the passages for the heat transfer medium, i.e. about 200 tubes were present in the region of the passages at the ends of the deflection plates.

In contrast, the reactor according to the present invention was left free of tubes in the deflection region for the heat transfer medium, i.e. in the region of the passages at the ends of the deflection plates.

For the reactor according to the prior art, the following table shows the significant differences between catalyst tubes in the deflection region for the heat transfer medium and catalyst tubes over which heat transfer medium flows transversely, i.e. catalyst tubes outside the deflection region for the heat transfer medium:

|  | Catalyst tubes in the deflection region | Catalyst tubes over which transverse flow occurs |
|---|---|---|
| Heat transfer coefficient from cooling medium to tube wall | 200 W/m²/K | 800 W/m²/K |
| Tube wall temperatures on the inside | 295.9° C. | 151.8° C. |
| Mean maximum reaction temperature in the catalyst bed | 568.5° C. | 545.5° C. |

The heat transfer coefficient from the cooling medium to the tube wall of 200 W/m²/K for the catalyst tubes in the deflection region was significantly lower than the heat transfer coefficient of 800 W/m²/K for the catalyst tubes over which transverse flow occurs.

This result can be explained by predominantly longitudinal flow of the heat transfer medium but virtually no transverse flow occurring in the deflection region filled with tubes at the interior wall of the reactor according to the prior art. Accordingly, the temperature of the tubes rose to 295.9° C. which damages the material. The heat transfer medium even began to boil in places. As a result of the relatively large gas bubbles, cooling deteriorated. Decomposition of the heat transfer medium formed deposits on the outside of the catalyst tubes, and these deposits had an insulating effect.

Severe material corrosion of about 0.8 mm per year on the catalyst tubes in the deflection region and some carbonization of the heat transfer medium monochlorobenzene on the cooling medium side of the catalyst tubes were thus found in a long-term test using a reactor according to the prior art.

In comparison, the heat transfer coefficient from the heat transfer medium to the tube wall was increased by a factor of four in the regions with transverse flow. As a consequence, the wall temperature reached on the inside of the catalyst tubes was 151.8° C. which is not damaging to the tube material and is still below the boiling point of the heat transfer medium monochlorobenzene under the pressure conditions in the heat transfer medium around the catalyst tubes, viz. 2.5 bar absolute. As a result, no damage to the catalyst tubes was found in the transverse flow region.

Furthermore, the maximum rise in the mean reaction temperature in the catalyst bed in catalyst tubes over which transverse flow occurred was 545.5° C. and thus significantly lower than the 568.5° C. in the catalyst tubes in the deflection region.

On the other hand, in the reactor according to the present invention, the catalyst tubes were omitted in the region of the passages at the ends of the deflection plates, i.e. in the deflection region for the heat transfer medium. The reactor according to the present invention therefore had only catalyst tubes over which the heat transfer medium flowed transversely, with the above-described significant process engineering advantages over the catalyst tubes over which predominantly longitudinal flow occurs in the deflection region for the heat transfer medium.

The method employed in the process of the present invention enabled considerable improvements in economics to be achieved: starting out from the same reactor but, as a difference from the prior art, without tubes in the deflection regions for the heat transfer medium, as illustrated in the example, the throughput of the gaseous reaction mixture was able to be approximately doubled when the amount of cooling medium was simultaneously increased compared to a reactor according to the prior art, resulting in a corresponding increase in the capacity of the reactor and a lengthening of the period of operation of the reactor.

We claim:

1. A process for preparing phosgene by gas-phase reaction of carbon monoxide and chlorine in the presence of a solid catalyst in one or more cylindrical reactors which has/have a bundle of parallel catalyst tubes which are aligned in the longitudinal direction of the reactor and whose ends are fixed in tube plates which have discharge holes therein, with a cap at each end of the reactor and deflection plates which are aligned perpendicular to the longitudinal direction of the reactor in the intermediate space between the catalyst tubes and leave free passages located alternately opposite one another on the interior wall of the reactor, and a compensator positioned in the reactor wall and ports or part-ring channels provided on the reactor wall for the introduction and discharge of the heat transfer medium and the openings of these ports or part-ring channels to the interior of the reactor have a circular or rectangular cross-section and an opening ratio in the range from 5 to 50%, the process consisting essentially of:
    charging the catalyst tubes with the solid catalyst,
    passing a gaseous reaction mixture comprising the carbon monoxide and the chlorine from one end of the reactor via one cap through the catalyst tubes,
    discharging the gaseous reaction mixture from the opposite end of the reactor via the second cap, and
    passing a liquid heat transfer medium through the intermediate space around the catalyst tubes, wherein the reactor (the reactors) for carrying out the process has/have no tubes in the region of the passages.

2. A process for preparing phosgene by gas-phase reaction of carbon monoxide and chlorine in the presence of a solid catalyst in one or more cylindrical reactors which has/have a bundle of parallel catalyst tubes which are aligned in the longitudinal direction of the reactor and whose ends are fixed in tube plates which have discharge holes therein, with a cap at each end of the reactor and deflection plates which are aligned perpendicular to the longitudinal direction of the reactor in the intermediate space between the catalyst tubes and leave free passages located alternately opposite one another on the interior wall of the reactor, and a compensator positioned in the reactor wall and ports or part-ring channels provided on the reactor wall for the introduction and discharge of the heat transfer medium and the openings of these ports or part-ring channels to the interior of the reactor have a circular or rectangular cross-section and an opening ratio in the range from 5 to 50%, the process consisting essentially of:
- charging the catalyst tubes with the solid catalyst;
- passing a gaseous reaction mixture consisting of carbon monoxide and chlorine into the space defined by one of said caps and a fixed tube plate at one end of the reactor and then through the catalyst tubes;
- discharging a gaseous reaction product mixture containing phosgene into the space defined by a fixed tube plate at the opposite end of the reactor and the second cap; and
- passing a liquid heat transfer medium via at least one point of entry in the reactor body through the intermediate space which surrounds the catalyst tubes and then exiting the reactor body through the at least exit, wherein the reactor (the reactors) for carrying out the process has/have no tubes in the region of the passages.

\* \* \* \* \*